United States Patent
Ballard

[11] 3,940,525
[45] Feb. 24, 1976

[54] TUFTED CARPET HAVING A POLYOLEFIN FILM AS THE SECONDARY BACKING

[75] Inventor: Edward Cooper Ballard, Wilmington, Del.

[73] Assignee: E. I. Du Pont de Nemours and Company, Wilmington, Del.

[22] Filed: Dec. 30, 1974

[21] Appl. No.: 537,598

[52] U.S. Cl. .................... 428/96; 156/72; 156/435; 428/97
[51] Int. Cl.² D03D 27/00; D04H 11/00; D05C 17/00
[58] Field of Search ............ 428/85, 94, 95, 96, 97; 156/72, 285, 324, 334, 435

[56] References Cited
UNITED STATES PATENTS

| | | | |
|---|---|---|---|
| 3,676,280 | 7/1972 | Sands | 428/97 |
| 3,679,469 | 7/1972 | Moore | 428/97 |
| 3,745,054 | 7/1973 | Smedberg | 428/97 |

*Primary Examiner*—Marion E. McCamish

[57] ABSTRACT

Improved process for preparing ethylene/vinyl acetate copolymer based hot-melt adhesive backsized tufted carpet wherein polyethylene, polypropylene or ethylene/vinyl acetate copolymer film is used as the secondary backing. Such carpets have unexpectedly and significantly improved tuft pull strength.

14 Claims, 1 Drawing Figure

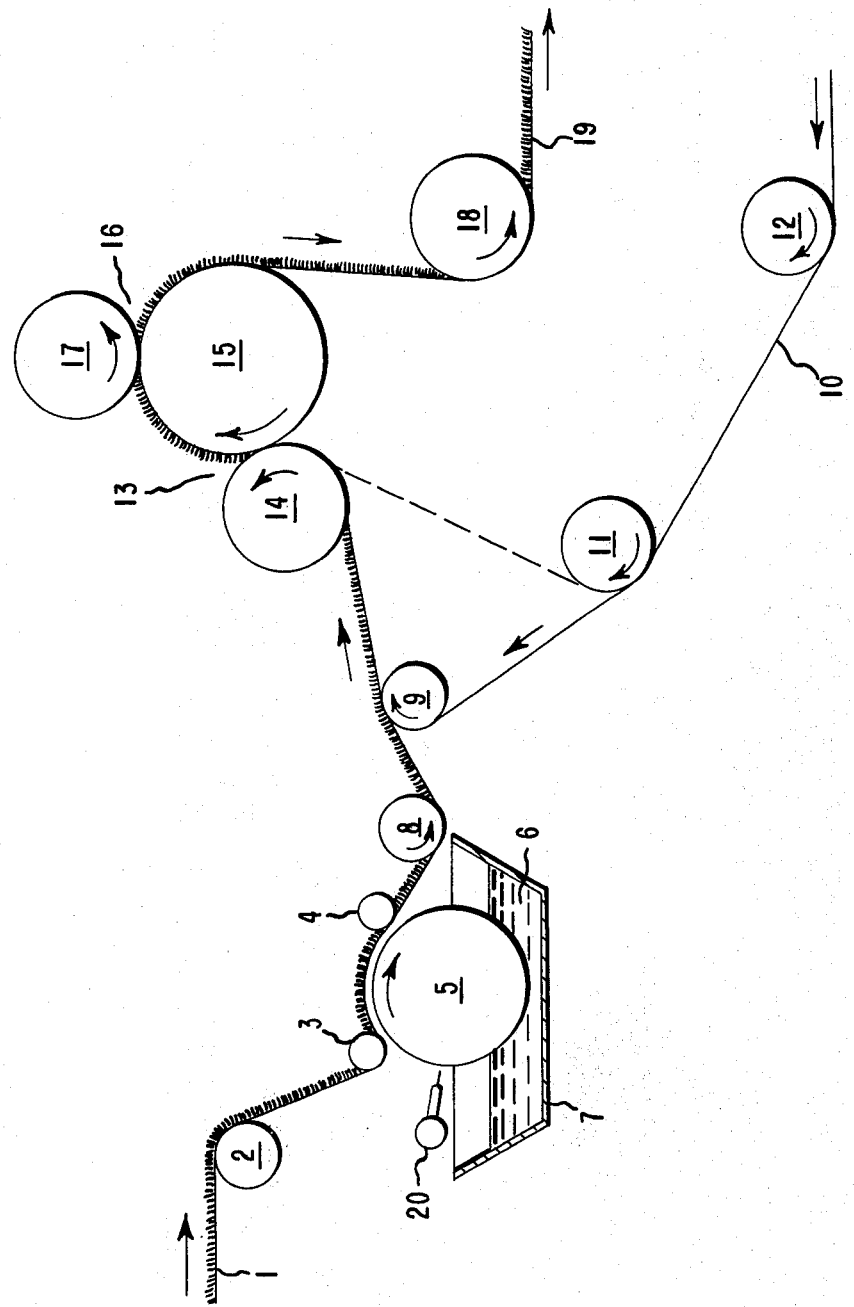

TUFTED CARPET HAVING A POLYOLEFIN FILM AS THE SECONDARY BACKING

BACKGROUND OF THE INVENTION

1. Field of the Invention

This invention relates to a process for preparing tufted carpets and more particularly it relates to the use of polyethylene, polypropylene and ethylene/vinyl acetate copolymer film as secondary backing in tufted carpets.

2. Description of the Prior Art

Presently most of the tufted carpet manufactured has jute as the secondary backing. As a result of the numerous disadvantages of jute there have been efforts made for finding a suitable substitute.

U.S. Pat. No. 3,560,284 discloses the method for preparing tufted carpets by using a plastisol composition as the backsizing agent and heat sealing a thermoplastic backing sheet, preferably a closed-cell foam to the plastisol coating.

U.S. Pat. No. 3,616,138 relates to bonding foamed thermoplastic resins such as polyethylene, ethylene/vinyl acetate, PVC, polyisobutylene, etc., foams to tufted carpets which are already backsized, for example, with a latex adhesive. The foamed underlayer is attached by sewing it in place or by gluing by pressure sensitive adhesive or latex of a natural or synthetic rubber, or by being applied to the partially dried bonding composition of the primary backing and thus eliminating the need for additional adhesives. After the foamed resin is applied to the carpet the adhesives or bonding composition is dried out.

U.S. Pat. No. 3,537,946 concerns a method of combining textile materials and a specific application for adhering a secondary backing web to a carpet by applying the adhesive from a heated manifold type distributing apparatus and using secondary backing materials such as rubber latex foam, polyurethane foam, butadiene-styrene foam and a rubber secondary backing sheet. This patent further discloses that "two or more components of various materials, such as fabrics of natural or synthetic fibers, natural or synthetic rubber sheet or foam, polyurethane and other polymeric foams, polypropylene woven and nonwoven backings, polymeric films and the like can be combined using hot melt adhesive according to the method of the invention."

SUMMARY OF THE INVENTION

According to the present invention there is provided in a process for backsizing a tufted carpet having a primary textile backing and tufts of yarn protruding therefrom which comprises heating an ethylene/vinyl ester copolymer based hot-melt adhesive backsizing composition to a temperature of about 160°F. to about 400°F., applying by a roll-coater a uniform coating of about 10–40 ounces per square yard of the composition in a molten state to the back side of the carpet while moving the carpet past the roll-coater, contacting the adhesive coated back side of the carpet with a secondary backing, pressing the primary and secondary backings together and solidifying the adhesive, the improvement comprising the use of a polymer film, selected from the group consisting of polyethylene, polypropylene and ethylene/vinyl acetate copolymers having a vinyl acetate content of up to about 18% by weight as the secondary backing.

Further provided according to the present invention are tufted carpets of unexpectedly improved tuft pull strength wherein the secondary backing is a polyethylene, polypropylene or ethylene/vinyl acetate film of up to about 18% by weight vinyl acetate content.

DESCRIPTION OF THE DRAWING

The FIGURE schematically depicts an arrangement of apparatus suitable for carrying out the process of the present invention.

DETAILED DESCRIPTION OF THE INVENTION

It has been discovered that tufted carpets can be backsized with ethylene/vinyl ester, preferably ethylene/vinyl acetate copolymer based hot melt adhesive compositions using polyethylene, polypropylene, or low vinyl acetate content ethylene/vinyl acetate copolymer films as secondary backing. The process can be carried out on the presently operating commercial lines with only minor modifications. The resulting carpet is more desirable in several respects than carpet wherein the secondary backing is jute or other woven or nonwoven porous fabric or foam. Advantages of polyethylene (PE), polypropylene, or low vinyl acetate content ethylene/vinyl acetate copolymer film secondary backed carpet, often referred to hereinafter as advantages of PE film backing, are as follows:

1. Present tufted carpets nearly always have jute weighing 6–8 ounces per square yard as the secondary backing. Carpet manufacturers would prefer to eliminate jute secondary backing and let the adhesive which holds the tufts into the primary backing also serve as the back of the carpet. This style of carpet is called "unitary" carpet. It has several drawbacks—the backing adhesive may not wear well, it frequently is not attractive, and it may block against the face of the carpet when the carpet is rolled for storage or shipment. In addition, since several adhesive types can be used in making carpet, unitary carpet offers installation problems when it has to be bonded to subflooring. When a clear thin polyethylene film is used as the secondary backing and covers the adhesive, the carpet is improved in appearance over the appearance of unitary carpet, and the carpet adhesive cannot block or transfer to the face of the carpet when rolled up. In addition, the carpet bottom has better wear characteristics and, by presenting a standard bottom surface, simplifies some installation problems.

2. Surprisingly an unpredictable and very important effect was observed: tuft pull strength (the force required to pull one tuft from the carpet) was significantly higher for polyethylene film-backed carpet than for corresponding unitary or jute-backed carpet or foam-backed carpet.

3. The nonporous smooth surface of the polyethylene film backing cuts down on the minimum quantity (volume) of adhesive needed in the backsizing operation when compared to that required using jute or preformed substrates as the secondary backing. This is because the film backing allows the molten adhesive to be pressed into the primary backing and into the yarn bundles sufficiently to give good encapsulation without loss of adhesive volume into the secondary backing.

4. Polyethylene film-backed carpet is less bulky than jute or foam-backed carpet and is easier to handle. In the carpet mill and in warehouses it requires less storage volume.

5. Polyethylene film backing is rot and moisture-proof. Film-backed carpet therefore can be used where it would not be practical to use jute-backed carpeting.

6. The back of clear polyethylene film-backed carpet has a neat and attractive appearance. However, if desired, this film surface can be printed with designs or reading material (trademarks, logos, instructions, etc.) much more readily than in the case of either unitary or jute-backed carpet or foam.

7. Polyethylene film-backed carpet offers the carpet mill substantial cost savings over jute- and even foam-backed carpet in the cost of raw materials since polyethylene film is much cheaper than these other substrates. Furthermore, adhesive cost reduction would also be expected to accompany the switch from jute or even foam to polyethylene film.

A process for carpet backsizing with an ethylene/vinyl ester, preferably ethylene/vinyl acetate copolymer based hot-melt adhesive system using a roll-applicator for the molten adhesive is disclosed in U.S. Pat. Nos. 3,390,035; 3,583,936, and 3,551,231, for example, and the disclosures of these patents are hereby incorporated by reference. These hot-melt adhesives are nonaqueous, solvent free and generally comprise about 10–90% by weight of an ethylene/vinyl acetate copolymer containing about 15–40% by weight vinyl acetate, about 10–90% by weight of wax, preferably petroleum derived or synthetic wax, and 0 to about 80% by weight of a thermoplastic resin such as rosin, rosin derivatives, coumarone-indene resins, terpene resins, terpene-phenolic resins, permanently fusible phenolic resins, and petroleum hydrocarbon resins. Preferred thermoplastic resins are terpene-phenolic resins and alkyl-aromatic hydrocarbon resins such as the ones derived from the alkylation of aromatic compounds with dicyclopentadiene and having a softening point of about 40°–105°F. The process comprises backsizing a tufted carpet having a primary textile backing and tufts of yarn protruding therefrom by heating an ethylene/vinyl ester copolymer based hot-melt adhesive backsize composition to a temperature of 160°F. to about 400°F., applying by a roll-coater a uniform coating of about 10–40 ounces per square yard of the composition in a molten state to the backside of the carpet while moving the carpet past the roll-coater, contacting the adhesive coated backside of the carpet with a secondary backing, pressing the primary and secondary backings together and solidifying the adhesive. For use with polyethylene, polypropylene and low vinyl acetate content ethylene/vinyl acetate copolymer film secondary backings the above general process is modified in some minor aspects as described below. Aqueous-based adhesives cannot be used in the process because of the difficult drying problems that would be encountered. The process cannot be carried out in an effective manner using a drop of powdered adhesives followed by melting, smoothing of the carpet, and then lamination of the flexible film because currently available hot-melt adhesives which have the necessary flexibility and are suitable for bonding the soft carpet to the film secondary backing cannot be ground and handled at room temperatures as free-flowing powders. They block and otherwise resist flow.

Adhesive properties, application temperatures, nip settings, etc., where not defined otherwise will generally follow the teachings of the above referred to carpet backsizing patents.

The films that are used as secondary backings according to the present invention are those of polyethylene, polypropylene, and low vinyl acetate content (up to about 18% by weight, preferably from about 4% to about 12% by weight) ethylene/vinyl acetate copolymers. Films of low density polyethylene (LDPE) are preferred but high density polyethylene, tactic polypropylene and the low vinyl acetate content ethylene/vinyl acetate copolymer films are also suitable. The ethylene/vinyl acetate copolymer films offer control of slip characteristics (increase the coefficient of friction) of the back of the carpet.

The examples below were run on pilot scale equipment which could continuously backsize 16 inches to 18 inches wide sections of carpet of 10 or more feet in length. Considerable experimental and development carpet backsizing work has been carried out on this equipment and the results obtained on it correlate very well with results obtained in carpet mills commercially operating hot-melt backsizing lines on 12-foot wide tufted broadloom carpet. This pilot process is schematically illustrated in the FIGURE. In general the major roll sizes on the pilot unit are essentially the same as they are or could be in a full-scale line in a carpet mill. Major differences are only found in the spacing and numbers of rolls, methods of heating and feeding the carpet through the line. In the pilot unit the applicator roll is internally heated with circulating hot oil and the adhesive supply is electrically heated. On full-scale equipment it may be more economical to use high pressure steam.

Soft carpet (pile faced fabric of carpet yarns tufted into a primary backing) 1 coming from a suitable feed roll passes downward over a straightening and smoothing roll 2 and then under hold-down rolls 3 and 4. The long loops of the carpet yarn are on the top side of the soft carpet. The hold-down rolls are adjustable and are set to press the carpet onto the surface of an 8 inch diameter hot-melt adhesive applicator roll 5 firmly enough to cause the adhesive to be wiped onto the underside of the carpet and into the short loops of carpeting yarn. This wiping action is aided by the fact that the applicator roll 5 is driven at a slower surface speed than that at which the carpet is traveling. In the following examples the carpet speed was either set at 15 or 30 feet/minute, and the surface speed of the applicator roll was always one-half the carpet speed. The applicator roll 5 is heated internally by a circulating hot oil system and is held within ± 5°F. of a set temperature selected within the range of 160°–400°F., depending on the melting point and viscosity of the adhesive being used, as well as its resistance to degradation at elevated temperatures. The molten adhesive 6 is stored in a shallow pan 7. The pan is electrically heated to maintain the main body of the adhesive at essentially the temperature of the applicator roll. The soft carpeting, now coated with molten adhesive, passes below a guide roll 8 and then over a mating roll 9 where it meets the film secondary backing 10 but is not significantly cooled in the process. The backing film itself arrives at 9 after passing over two guide and smoothing rolls 11 and 12, having come from a suitable feed supply roll. The adhesive layer in the joined carpet structure just beyond roll 9 still is molten, and the travel time from roll 9 to the nip 13 between a 10 inch diameter water-chilled roll 15 at 50°–55°F. and a 6 inch diameter rubber-covered roll 14 is such that the adhesive can wet and make a good bond to the film secondary backing. The complete distance from the coating roll to the first bonding nip 13 is approximately 24 inches. At a line speed of 30 feet/minute this corresponds to 4 seconds time between application of the adhesive and chilling the bond. The mating roll 9, when located at the midpoint of this travel, allows the film about 2 seconds of hot contact with the adhesive at 30 feet/minute or 4 seconds' contact at 15 feet/minute line speed. When the film 10 has a rather low softening point, perhaps lower than the application temperature of the adhesive, roll 9 can be brought closer to nip 13 to shorten the hot contact time. To further shorten the hot contact time, roll 9 can even be removed and the film 10 allowed to mate with the hot adhesive coating on roll 14 after coming from roll 11 — as indicated by the dashed line alternate path for the film. The rubber-covered roll 14 is movable so that the gap at the nip can be adjusted in relationship to the thickness of the carpet being backsized. Roll 15 is driven and furnishes, together with a rough-surfaced roll not shown, the pull to draw the carpet through the process. In commercial lines tenter frames serve this function. A secondary bonding nip 16 is available between rolls 15 and 17. Roll 17 is dead weight loaded to apply between 2–3 lbs. force per linear inch of carpet width. The quenched carpet structure with the adhesive set but not completely cooled passes 180° around the chilled water roll 15 and then under roll 18. From there it can go over a further cooling roll, or table, and then to a windup roll.

The weight of adhesive required to lock the carpet yarn loops to the primary backing, to encapsulate the yarn bundles and to bond the flexible film secondary backing to the basic carpet structure varies from about 10 to 40 oz./sq. yd., depending on the adhesive, its density, the carpet structure, and the performance requirements needed for the finished structure. The weight of the adhesive is controlled primarily by the doctor blade 20 setting which governs the thickness of the adhesive pickup on the applicator roll 5. To a lesser extent, the adhesive pickup on the carpet, the coating weight, is also influenced by the temperature and viscosity of the adhesive, the line speed, and the hold-down roll settings.

The following examples are given for the purpose of illustrating the invention. All parts and percentages are by weight unless otherwise specified.

EXAMPLES 1 TO 3

The following adhesive formulation was prepared:

|  | Wt.% |
|---|---|
| Experimental ethylene/vinyl acetate (E/VAc) copolymer | 50 |
|     Wt. % vinyl acetate = 20.8 |  |
|     Melt index = 52 |  |
| "Pacemaker" 53 paraffin wax from Cities Service Oil Company; melting point 149°F. | 2 |
| "Multiwax" 180M microwax from Moore and Munger; melting point 180°F. | 23 |
| XPS-377, experimental terpene phenolic resin from PICCO Division of Hercules; melting point 120°C. | 25 |
| 2,6-ditertiary butyl-4-methyl phenol (antioxidant)- added wt. %. | 0.1 |
| Viscosity at: |  |
|     300°F. = 16,500 cps |  |
|     340°F. = 8,600 cps |  |

The above adhesive was used to backsize "Benefactor" grade of contract style low level loop tufted carpet of nylon yarn tufted into woven polypropylene backing.

The soft carpet was obtained from Lees Carpet Division of Burlington Industries. Three different finished carpets were prepared on the 18 inch pilot coater line, one with jute secondary backing, one of unitary construction (no secondary backing), and one backed with 2½ mil low density polyethylene film. When jute was applied as the secondaray backing the pilot line was modified from that depicted in the FIGURE so that the jute passed from roll 11 to, and around to the top of roll 8 where it mated with the hot adhesive coated soft carpet coming from hold down roll 4 to the top of roll 8. At roll 8 the joined carpet passed through a nip formed between roll 8 and a dead weight loaded roll (not shown in the FIGURE) located immediately above roll 8. This second roll applied a dead weight of 3 lbs/linear inch in bonding the secondary backing to the hot adhesive coated soft carpet. From there the backsized carpet passed over a 2 foot long stainless steel supporting table cooled on the bottom side with coils carrying water at approximately 50° F. and entered nip 16. The carpet then followed the path as indicated in the FIGURE. The method used here in applying the jute secondary backing is essentially that described and illustrated in U.S. Pat. No. 3,551,231. Data on these experiments and on the characteristics of the carpet produced are given below:

|  | Example | | |
|---|---|---|---|
|  | 1 | 2 | 3 |
| Hold-down roll clearances | 0.220" | 0.250" | 0.250" |
| Doctor blade clearance | 0.160" | 0.160" | 0.160" |
| Backsizing line speed | 15'/min. | 15'/min. | 15'/min. |
| Adhesive Temperature, °F. | 330 | 340 | 325 |
| Nip (13) Clearance | — | 0.100" | 0.100" |
| Adhesive used, oz./sq. yd. | 15.8 | 16.5 | 15.5 |
| Secondary backing | 8 oz. jute | None[1] | 2½ mil polyethylene film |
| Average of 10 tuft pulls, lbs.[2] | 22+ | 25+ | 27+ |
| No. of tuft breaks out of 10 tufts pulled | 2 | 5 | 9 |
| Wire brush fuzz rating of carpet[3] | 0 | 0 | 0 |

[1] Run as described above except no film was fed to the unit and roll (9) was removed.
[2] Determined by ASTM Test D-1335-67 or by pulling individual tufts manually using a Chatillon 0–40 lb. gauge-R, Catalog No. 719-40 (obtained from John Chatillon and Sons, Kew Gardens, N.Y. 11415). They give very similar results and both methods are used by carpet mills in testing their carpets. When a plus (+) sign follows the number it means one or more of the ten tufts gave yarn break rather than being pulled from the backing. In these cases the value for pulling the loop of yarn from the carpet is higher than the failure point of the yarn. Therefore the true average tuft pull is by an unknown amount greater than the numerical average of the fail points of the ten loops pulled.
[3] Measured by 20 strokes of a wire brush and subjectively compared for fuzz with following ratings: O=no fuzz; N=noticeable fuzz; M=moderate fuzz; A=appreciable fuzz. Fuzz rating of O, N, or M is acceptable. No fuzz indicates good wear performance.

The results from these three experiments indicate that, using one adhesive at essentially a constant coating weight per square yard of carpet, the regular jute-backed carpet, although giving good tuft pull performance, nevertheless was poorer in both tuft pull strength and the number of loops that broke, rather than pulled out, than either "unitary" carpet or carpet backed with polyethylene film. The last carpet (Example 3) was, by a significant amount, the best of the three. This carpet, backed with polyethylene film, gave the highest average tuft pull. With this carpet only one of 10 tufts tested pulled from the carpet rather than giving complete yarn break.

EXAMPLES 4 TO 7

Four different hot-melt adhesives, compositions given in Table I, were used to backsize "Faculty" grade low, level loop pile contract style carpet. This was a high quality carpet obtained in soft form from Lees Carpet Division of Burlington Industries. Two secondary backings were applied to this soft carpet: 8 oz. jute and a 2½ mil low density polyethylene film available from E. I. du Pont de Nemours & Co. The backsizing conditions and important properties of the carpet are given in Table II. In the four examples shown in Table II, when the jute-PE secondary backing pairs were matched as closely as possible with respect to machinery settings and adhesive add-on, the PE backed carpet was much better in major physical properties than the jute-backed carpet. Thus the tuft pulls on the PE backed carpet ranged from 24% to 36% higher than obtained with the jute-backed carpet. This must further be considered in the light of current commercial carpet performance. Commercial contract carpet tuft pulls generally lie in the range of 7 to 12 lb./tuft, with 15 lb. values being difficult to attain. Thus, in Examples 4 through 7 we have prepared jute-backed carpet of excellent tuft pull quality. Nevertheless switching from jute to a thin PE film for the secondary backing increases tuft pull performance of the carpet substantially. This performance of the PE backing is a surprising and unpredictable benefit obtained in going to this attractive new carpet structure.

In addition, the PE backing permits better bonding of the individual fibers in each yarn bundle than when using a jute backing. Thus the wire brush fuzz ratings of the PE backed carpet were significantly better than obtained with the jute-backed carpet.

EXAMPLES 8 AND 9

None of the polyethylene film backing runs described in Examples 1 through 7 were run with mating roll 9 in place. All were based on the alternate film path shown in the FIGURE. In some cases it was possible with care to pull the thin PE film from the back of the finished carpet and end up with a unitary type of carpet (no secondary backing). In other cases the PE film-adhesive bond was so firm that the PE film could not be pulled from the carpet structure. It was also demonstrated, where separation could be affected, that 1–5 seconds' added hot contact time between the PE film and the adhesive gave bonds which could no longer be separated. In the case of the runs described in Examples 5 and 6 the PE film could be separated from the carpet structure. Tuft pull measurements were determined for the unitary carpet thus produced. The data are given below.

TABLE I

| Ingredients in % by Weight | Example 4 | Example 5 | Example 6 | Example 7 |
|---|---|---|---|---|
| "Elvax" 420, E/VAc resin from E. I. du Pont de Nemours, 18% VAc, 150 MI | 46 | — | — | 28 |
| "Elvax" 220, E/VAc resin from E. I. du Pont de Nemours, 28% VAc, 150 MI | — | — | — | 18 |
| Experimental E/VAc resin from E. I. du Pont de Nemours, 25% VAc, 10 MI | — | 34 | 29 | — |
| "Polywax" 2000, low mol. wt. polyethylene from Petrolite Corp. (Bareco Div.), m.p.t. 257°F. | 4 | 4 | 4 | 4 |
| "Nirez" 2040, Terpene phenolic resin from Reichhold Chem. m.p.t. 118°C. | 25 | 25 | 25 | 25 |
| "Piccovar" L-60, alkyl aromatic resin from Picco Division of Hercules m.p.t. 60°C. | 25 | 25 | 31 | 25 |
| "Multiwax" | — | 8 | 8 | — |
| "Pacemaker" 53, Paraffin wax | — | 4 | 3 | — |
| 2,6-ditertiary butyl-4-methyl phenol, added % | 0.1 | 0.1 | 0.1 | 0.1 |

TABLE II

| | Example 4 | | Example 5 | | Example 6 | | Example 7 | |
|---|---|---|---|---|---|---|---|---|
| Secondary backing[1] | Jute | PE | Jute | PE | Jute | PE | Jute | PE |
| Hold-down roll clearances, in. | 0.250 | 0.250 | 0.250 | 0.250 | 0.250 | 0.250 | 0.250 | 0.250 |
| Doctor blade clearance, in. | 0.160 | 0.140 | 0.160 | 0.150 | 0.160 | 0.155 | 0.160 | 0.160 |
| Backsizing line speed, feet/min. | 15 | 15 | 15 | 30 | 15 | 30 | 30 | 30 |
| Nip[3] clearance, in. | — | 0.100 | — | 0.100 | — | 0.100 | — | 0.100 |
| Adhesive visc. Mcps. at 300°F. | 12.4 | 12.4 | 20.7 | 20.7 | 9.90 | 9.90 | 12.0 | 12.0 |
| Adhesive application temp., °F. | 330 | 340 | 340 | 340 | 310 | 300 | 320 | 310 |
| Adhesive used, oz./sq. yard. | 18.4 | 17.8 | 19.9 | 19.6 | 18.7 | 19.0 | 17.4 | 19.0 |
| Avg. of 10 tuft pulls, lbs. | 24+ | 32+ | 25+ | 31+ | 22 | 30+ | 21 | 26+ |
| No. of tuft breaks out of 10 tufts pulled | 1 | 5 | 1 | 4 | 0 | 4 | 0 | 1 |
| Wire brush fuzz rating[2] | A | N | A | N-M | A | N | A | M |

[1] 8 oz./sq. yd. jute, and 2½ mil low density polyethylene film, respectively.
[2] A (appreciable) = unacceptably high
 N (noticeable) = very good, very low fuzz
 M (moderate) = borderline to being acceptable

|  | Avg. Tuft Pull, lbs. (10 Tufts) | Breaks/ 10 Tufts Pulled |
| --- | --- | --- |
| Example 5 polyethylene backed | 31 | 4 |
| Example 8 (Example 5 stripped of polyethylene film) | 26 | 0 |
| Example 6 polyethylene backed | 30 | 4 |
| Example 9 (Example 6 stripped of polyethylene film) | 27 | 0 |

These results further indicate that the 2½ polyethylene film secondary backing contributes to a surprising and significant extent to the high tuft pull performance of the carpet structure.

EXAMPLE 10

Example 7 was repeated using 4 mil low density polyethylene film (both the 2½ mil and 4 mil films were used in the backsizing operation such that the adhesive was bonded to the untreated side of the film). The results with the 4 mil film were similar to those with 2½ mil film:

|  | Polyethylene Film | Coating Wt. oz./sq. yd. | Avg. Tuft Pull, lbs. | Tuft Breaks per 10 Pulls |
| --- | --- | --- | --- | --- |
| Example 7 | 2½ mil | 19.0 | 26 | 1 |
| Example 10 | 4 mil | 18.7 | 28 | 1 |

EXAMPLE 11

The performance of a filler containing ethylene/vinyl acetate/copolymer-based adhesive with a somewhat lower performance level was checked using 8 oz. jute, 2½ mil PE film, 3 mil calcium carbonate-filled PE film, very low density 1/16 inch thick polypropylene foam sheeting ("Microfoam" from E. I. du Pont de Nemours and Company), and ½ mil uncoated polyethylene terephthalate film (Du Pont "Mylar" Type 50 A) as the secondary backing for "Faculty" grade contract style carpet. The adhesive composition is given in Table III. Table IV shows the major operating conditions and the properties of the finished backsized carpet. The jute-backed carpet gave a lower level of tuft pull with the lower performance filled backsize composition than given in the jute examples reported earlier but again when polyethylene film was used as the secondary backing, tuft pull performance went up. In this case switching from jute to polyethylene film gave a 50% improvement in tuft pull strength, even though the adhesive coating weight went down slightly. Carpet with secondary backings of a calcium carbonate-filled polyethylene film, "Mylar" and "Microfoam" gave better tuft pull values than jute but not as good as polyethylene film. These results again indicate the improvement in carpet performance associated with the use of thin, flexible polyethylene film secondary backings.

TABLE III

|  | Example 11, wt% |
| --- | --- |
| Experimental E/VAc resin, 25% VAc, 10 MI | 20 |
| "Polywax" 2000 | 3 |
| "Piccovar" L-60 resin | 45 |
| "Pacemaker" 53 paraffin wax | 2 |
| No. 9 Whiting - ground calcium carbonate filler | 30 |
| 2,6 ditertiary butyl - 4 - methyl phenol (added wt %) | 0.2 |
| Adhesive Viscosity at 300°F. in cps | 12,200 |

TABLE IV

| Secondary Backing | jute | PE film | Example 11 Filled PE | "Microfoam" | "Mylar" 50A |
| --- | --- | --- | --- | --- | --- |
| Hold-downroll clearances, in. | 0.300 | 0.250 | 0.250 | 0.250 | 0.250 |
| Doctor blade clearance, in. | 0.155 | 0.155 | 0.170 | 0.165 | 0.170 |
| Backsizing line speed, feet | 30 | 30 | 15 | 15 | 15 |
| Nip (13) clearance, in. | — | 0.110 | 0.110 | 0.115 | 0.110 |
| Adhesive Application temp., °F | 320 | 320 | 320 | 320 | 320 |
| Adhesive used, oz./sq. yard | 24.1 | 22.8 | 19.3 | 19.7 | 19.6 |
| Avg. of 10 tuft pulls, lbs. | 15 | 22 | 18 | 19 | 18 |
| No. of tuft breaks out of 10 tufts pulled | 0 | 0 | 0 | 0 | 0 |
| Wire brush fuzz rating | A | A | — | A-M | A |

In general, replacing the jute secondary backing with a flexible polyethylene film, such as the 2½ mil low density film used in several of the above examples, carpet hand goes slightly soft. The hand of the film-backed carpet has been rated "satisfactory," "good," "no problem," etc., by various people with experience in this field.

These polyethylene film-backed contract carpets, based on either unfilled or on filled hot-melt adhesive backsizing sytems, all passed the methenamine pill test (ASTM D-2859-70T) for carpet fire resistance. This was true whether the test was applied normally to the face of the carpet or to the back of the carpet where the pill burned directly on the film backing.

EXAMPLES 12 TO 14

The performances of three hot melt formulations of rather high total E/VAc polymer content were checked as backsizing adhesives using "Faculty" grade contract style carpeting. Three different secondary backings were included in the program. They were: 8 oz./sq. yd. jute, 2.4 mil low density polyethylene film (without any surface treatment for adhesion promotion) and 1/16 inch thick, very low density, polypropylene foam sheeting. ("Microfoam" from E. I. du Pont de Nemours & Co.).

The adhesive compositions are given in Table V. Table VI shows the major operating conditions and the properties of the finished backsized carpet. The target for adhesive coating weight for this study was 16 ± 1 oz. per square yard of carpet. This was met in seven of the eight runs and was just barely missed in the other which had a 17.1 oz./sq. yd. coating weight. Thus, it is believed that fair comparisons may be made among these eight runs.

Taking the jute backed carpet as the standard for comparison it is seen that average tuft strength varies from adhesive to adhesive. All the jute based data (16, 22 and 23 pound average tuft pulls) indicate high performance for all three adhesives. However, PE film backed carpet always gave higher (20 to 40% higher) tuft pulls than the comparable jute backed carpet. This is a very significant and desirable increase in performance and is particularly interesting when representing improvement over a tuft pull level that already is in a range of very good performance. It is interesting to note that, in the two cases where comparable data were available for thin foam backed carpet the tuft pull level was either in the range of that of jute backing, or close to it. The foam backed carpet did not show the tuft pull levels possessed by the PE film backed carpet.

over roll 9 and meets the hot adhesive coating about 15 inches before passing through nip 13. This gives the hot adhesive approximately 2 seconds, at a line speed of 30 feet per minute, to wet and establish a good bond to the secondary backing film, before the adhesive-film system is quenched in the rubber roll-chill roll nip. When jute is used as the secondary backing the process as indicated in the FIGURE can not be used to advantage. This is because: (1) too much of the adhesive is forced into the jute secondary backing and is lost with respect to doing an effective job of locking the individual tufts into the primary backing and (2) the adhesive which is forced through the jute can contaminate the top surface of the carpeting when the carpet is rolled for storage and shipment. Therefore, when jute was applied the backing process was carried out as indicated in Example 1.

The performances of three different thin films were compared to that of 6 oz./sq. yard jute as secondary carpet backings. The three films were (1) 2½ mil low density polyethylene film (the treated side of the film contacted the adhesive); (2) 2 mil film prepared from "Alathon" 3120 (available from E. I. du Pont de Nemours and Co.). This is a 1.2 MI ethylene/vinyl acetate copolymer containing about 7.5 weight percent copolymerized vinyl acetate; (3) 1 mil surface treated polypropylene film obtained from Hercules, Inc. Surface treatments such as mentioned above usually involve exposing the film surface to a hot flame or some type of electric discharge. The treatments are designed to im-

TABLE V

| Example No. | Blend Composition, Weight Percent | | |
|---|---|---|---|
| | 12 | 13 | 14 |
| "Elvax" 410 (E/VAc polymer from E. I. du Pont de Nemours & Co., 18% VAc, 500 MI) | 30 | 30 | 34 |
| "Elvax" 420 | 30 | 30 | 34 |
| "Polywax" 2000 | 4 | 4 | 4 |
| "Picco" XPS-445 (experimental terpene-phenolic resin from Picco Division of Hercules, melting point 126°C.) | 18 | 18 | 28 |
| "Piccovar" L-60 | 18 | — | — |
| "Foral" 85 (ester of hydrogenated rosin from Hercules, melting point 82°C.) | — | 18 | — |
| 2,6 ditertiary butyl-4-methyl phenol, added wt. % | 0.2 | 0.2 | 0.2 |

TABLE VI

| Example No. | 12 | | 13 | | | 14 | | |
|---|---|---|---|---|---|---|---|---|
| Secondary Backing | Jute | PE Film | Jute | PE Film | Microfoam | Jute | PE Film | Microfoam |
| Holddown roll clearances, ins. | 0.230 | 0.250 | 0.230 | 0.250 | 0.250 | 0.230 | 0.250 | 0.250 |
| Doctor blade clearance, ins. | 0.170 | 0.160 | 0.180 | 0.165 | 0.165 | 0.170 | 0.170 | 0.170 |
| Backsizing line speed, ft./min. | 15 | 15 | 15 | 30 | 15 | 15 | 30 | 15 |
| Nip (13) clearance, ins. | — | 0.100 | — | 0.110 | 0.115 | — | 0.110 | 0.115 |
| Adhesive viscosity M cps. at 300°F. | 16.0 | 16.0 | 17.9 | 17.9 | 17.9 | 31.1 | 31.1 | 31.1 |
| Adhesive application temperature, °F. | 320 | 320 | 340 | 340 | 320 | 340 | 350 | 340 |
| Adhesive used, oz./sq. yard | 15.8 | 16.1 | 16.8 | 17.1 | 15.5 | 16.4 | 16.1 | 16.1 |
| Average of 10 tuft pulls, lbs./tuft | 16 | 22 | 22+ | 26+ | 21 | 23 | 29+ | 25+ |
| No. of tuft breaks out of 10 tufts pulled | 0 | 0 | 1 | 1 | 0 | 0 | 5 | 2 |
| Wire brush fuzz rating | A | N | A | A | A | A | M | M |

EXAMPLES 15 AND 16

The performance of two hot melt formulations for backsizing "Faculty" grade contract style carpet with thin polymer films was determined using the improved machine configuration indicated in the FIGURE. In this modified process the secondary backing film passes prove the ease with which printing inks and/or adhesives can wet and adhere to these films. The composition of the adhesive used in Example 15 was the same as that used in Example 11 and is given in Table III. The composition of the adhesive used in Example 16 is given in Table VII. It is very high in E/VAc polymer content.

TABLE VII

| | Example 16, blend composition weight percent |
|---|---|
| "Elvax" 410 | 85 |
| "Polywax" 2000 | 3 |
| "Picco" XPS-445 | 12 |
| 2,6 ditertiary butyl-4-methyl phenol (added weight percent) | 0.2 |

Table VIII shows the major operating conditions and the properties of the backsized carpets. Carpets having a secondary backing of film showed 30–50% greater tuft pull strength than the carpets with the jute secondary backing. These three films are of related compositions - being either polyolefins or an olefin polymer containing a rather low amount of copolymerized vinyl acetate. These results further demonstrate the significant advantages certain film secondary backings have over the secondary backings which are presently in general usage.

TABLE VIII

| Example No. | 15 | | | | 16 | | | |
|---|---|---|---|---|---|---|---|---|
| Secondary backing | Jute | PE Film | E/VAc Film | PP Film | Jute | PE Film | E/VAc Film | PP Film |
| Holddown roll clearances, ins. | 0.270 | 0.250 | 0.250 | 0.250 | 0.250 | 0.250 | 0.250 | 0.250 |
| Doctor blade clearance, ins. | 0.120 | 0.110 | 0.100 | 0.100 | 0.125 | 0.105 | 0.100 | 0.100 |
| Backsizing line speed, ft./min. | 30 | 30 | 30 | 30 | 30 | 30 | 30 | 30 |
| Nip (13) clearance, ins. | — | 0.115 | 0.110 | 0.110 | — | 0.110 | 0.110 | 0.110 |
| Adhesive Viscosity M cps. at 300°F. | 12.0 | 12.0 | 12.0 | 12.0 | 29.9 | 29.9 | 29.9 | 29.9 |
| Adhesive application temperature, °F. | 320 | 310 | 310 | 310 | 340 | 350 | 345 | 330 |
| Adhesive used, oz./sq. yard | 26.3 | 24.9 | 25.8 | 25.2 | 18.9 | 18.0 | 18.1 | 18.7 |
| Average 10 tuft pulls, lbs./tuft | 16 | 23 | 23 | 23 | 14 | 19 | 18 | 19 |
| No. of tuft breaks out of 10 tufts pulled | 0 | 1 | 1 | 1 | 0 | 0 | 0 | 0 |

In Examples 15 and 16 the use of the alternate film path around roll 9 gave about 2 seconds of hot contact time between the film and the backsizing adhesive. This increased contact time allowed such a firm bond to be established between the film secondary backing and the adhesive layer that the film could not be pulled from the carpet structure. Complete film failure occurred in all such attempts.

I claim:

1. In a process for backsizing a tufted carpet having a primary textile backing and tufts of yarn protruding therefrom which comprises heating an ethylene/vinyl ester copolymer based hot melt adhesive backsizing composition to a temperature of about 160°F. to about 400°F., applying by a roll-coater a uniform coating of about 10–40 ounces per square yard of the composition in a molten state to the back side of the carpet while moving the carpet past the roll-coater, contacting the still molten adhesive coated back side of the carpet with a secondary backing, pressing the primary and secondary backings together and solidifying the adhesive, the improvement comprising the use of a polymer film, selected from the group consisting of polyethylene, polypropylene and ethylene/vinyl acetate copolymers having a vinyl acetate content of up to about 18% by weight as the secondary backing.

2. The process of claim 1 wherein the ethylene/vinyl ester copolymer of said adhesive composition is ethylene/vinyl acetate copolymer having a vinyl acetate content of from about 10 to 40% by weight.

3. The process of claim 2 wherein said secondary backing is a polyethylene film.

4. The process of claim 3 wherein said secondary backing is a low density polyethylene film.

5. The process of claim 2 wherein said secondary backing is a polypropylene film.

6. The process of claim 5 wherein said secondary backing is a tactic polypropylene film.

7. The process of claim 2 wherein said secondary backing is an ethylene/vinyl acetate copolymer film having a vinyl acetate content of from about 4 to about 12% by weight.

8. In a carpet comprising a primary backing stitched with closely spaced erect loops of yarn to form a tufted structure, an ethylene/vinyl ester copolymer based hot melt adhesive backsizing composition on the back side of said primary backing and a secondary backing adhered by said backsizing composition to said primary backing, the improvement comprising a secondary backing selected from the group consisting of polyethylene film, polypropylene film and ethylene/vinyl acetate copolymer film having a vinyl acetate content of up to about 18% by weight.

9. The carpet of claim 8 wherein the ethylene/vinyl ester copolymer of said adhesive composition is ethylene/vinyl acetate copolymer having a vinyl acetate content of from about 10 to about 40% by weight.

10. The carpet of claim 9 wherein said secondary backing is a polyethylene film.

11. The carpet of claim 10 wherein said secondary backing is a low density polyethylene film.

12. The carpet of claim 9 wherein said secondary backing is a polypropylene film.

13. The carpet of claim 12 wherein said secondary backing is a tactic polypropylene film.

14. The carpet of claim 9 wherein said secondary backing is an ethylene/vinyl acetate copolymer film having a vinyl acetate content of from about 4 to 12% by weight.

* * * * *